(12) United States Patent
Chitturi et al.

(10) Patent No.: US 6,760,780 B1
(45) Date of Patent: Jul. 6, 2004

(54) METHOD AND SYSTEM FOR PROXYING TELEPHONY MESSAGES

(75) Inventors: Ajay P. Chitturi, Bellevue, WA (US); Arlie L. Davis, Seattle, WA (US); Deepak Kumar, Kirkland, WA (US); Ilya A. Kleyman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/578,848

(22) Filed: May 25, 2000

(51) Int. Cl.[7] .............................................. G06F 15/16
(52) U.S. Cl. ...................... 709/248; 709/217; 709/218; 709/230; 709/203; 713/200; 713/201; 370/351; 370/352
(58) Field of Search ................................ 709/227–228, 709/217–218, 230, 245; 370/351–352; 713/200–201

(56) References Cited

U.S. PATENT DOCUMENTS 5,987,508 A * 11/1999 Agraharam et al. ........ 709/217
6,061,798 A * 5/2000 Coley et al. ................ 713/201
6,421,339 B1 * 7/2002 Thomas ...................... 370/352

OTHER PUBLICATIONS

Microsoft Corporation, *Internet Connection Sharing*, 3pp., (Apr. 7, 1999).
Wahl, et al., *Lightweight Directory Access Protocol (v3)*, 50 pp., RFC 2251 (Dec. 1997).
Egevang, et al., *The IP Network Address Translator (NAT)*, 10 pp., RFC 1631 (May 1994).

* cited by examiner

*Primary Examiner*—Jack B. Harvey
*Assistant Examiner*—Hien Le
(74) *Attorney, Agent, or Firm*—Leydig, Voit & Mayer Ltd.

(57) ABSTRACT

A proxy computer of a network can receive incoming telephony messages from one or more computers outside of the network and proxy them to computers within the network. Similarly, the proxy computer can receive outgoing telephony messages from within the network and proxy them to computers outside of the network. To set up inbound calls, a proxy program on the proxy computer looks for the presence of an alias in the call signaling messages, references a data structure to determine which computer on the network is associated with the alias, and proxies the call signaling and control messages between the callee computer and the calling computer based on the association, thereby creating a logical connection between the calling computer and the callee computer.

18 Claims, 12 Drawing Sheets

METHOD AND SYSTEM FOR PROXYING TELEPHONY MESSAGES

TECHNICAL FIELD

This invention relates generally to telephony over a computer network and, more particularly, to a method and system for proxying a call originating from a public network to a computer on a private network using a publicly known alias available from a directory service.

BACKGROUND

Telephony over computer networks has become more and more popular in recent years. In particular, multi-party conferencing systems such as NETMEETING by the MICROSOFT CORPORATION have given consumers and businesses the ability to conduct full audio and visual teleconferencing over traditional computer networks, thereby avoiding the high costs associated with renting time at a dedicated conference center.

One problem associated with network telephony is that most private networks are protected from the outside through the use of a proxy or firewall. Therefore, the internal IP addresses of the computers behind the proxy are hidden from potential callers outside the private network. This makes it impossible for outside callers to call a computer on a private network directly. Thus, it can be seen that there is a need for a novel method and system for proxying telephony messages.

SUMMARY OF THE INVENTION

In accordance with this need, a method and system for proxying telephony messages is provided. According to the method and system, a proxy computer of a private network can receive incoming telephony messages from one or more computers of a public network and proxy them to computers within the private network. Similarly, the proxy computer can also receive outgoing telephony messages from within the network and proxy them to computers outside of the network. To enable inbound calls, a proxy program on the proxy computer looks for the presence of an alias in the call signaling messages, references a data structure to determine which computer on the network is associated with the alias, and proxies the call signaling and control messages between the callee computer and the calling computer based on the association, thereby creating a logical connection between the calling computer and the callee computer.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
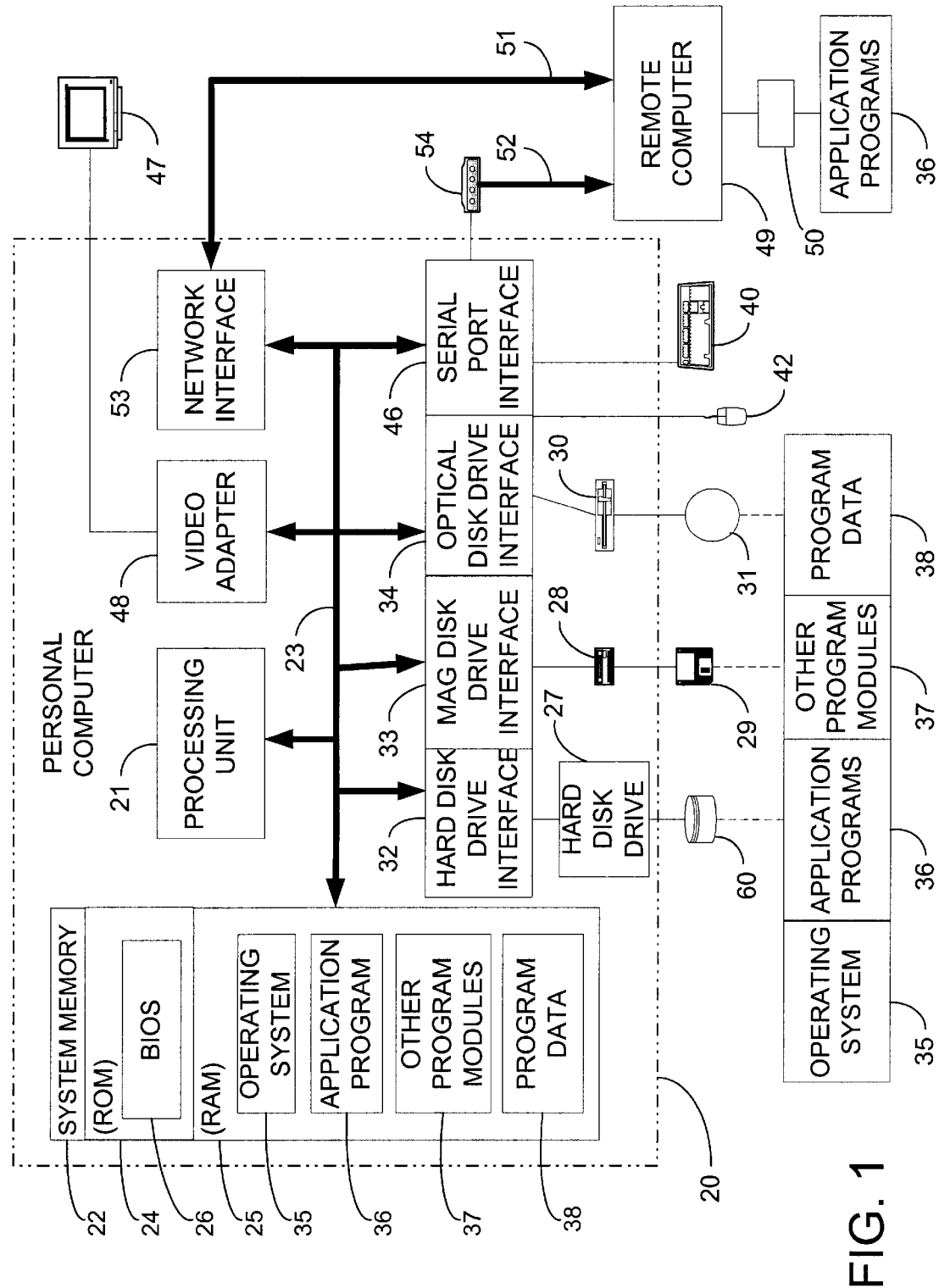
FIG. 1 is a block diagram illustrating an example computer environment in which the invention may be used.

Turning to the drawings, wherein like reference numerals refer to like elements, an exemplary environment for implementing the invention is shown in FIG. 1. The environment includes a general purpose-computing device 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in the ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computing device 20 through input devices such as a keyboard 40, which is typically connected to the computing device 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 viaan interface, such as a video adapter 48. In addition to the monitor, computing devices typically include other peripheral output devices, not shown, such as speakers and printers.

The computing device 20 may operate in a networked environment using logical connections to one or more devices within a network 63, including another computing device, a server, a network PC, a peer device or other network node. These devices typically include many or all of the elements described above relative to the computing device 20. The logical connections depicted in FIG. 1 include a land-based network link 51, for which there are many possible implementations, including a local area network (LAN) link and a wide area network (WAN) link. Land-based network links are commonplace in offices, enterprise-wide computer networks, intranets and the Internet and include such physical implementations as coaxial cable, twisted copper pairs, fiber optics, and the like. Data may transmitted over the network links 51 according to a variety of well-known transport standards, including Ethernet, SONET, DSL, T-1, and the like. When used in a LAN, the computing device 20 is connected to the network 51 through a network interface card or adapter 53. When used in a WAN, the computing device 20 typically includes a modem 54 or other means for establishing communications over the network link 51, as shown by the dashed line. The modem 54, which may be internal or external, is connected to the system bus 23 via the serial port interface 46. In a networked environment, programs depicted relative to the computing device 20, or portions thereof, may be stored on other devices within the network 63.

Those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more programs or modules executing on a computer system or being executed by parts of a CPU. A "program" or "module" is any instruction or set of instructions that can execute on a computer, including a process, procedure, function, executable code, dynamic-linked library (DLL), applet, native instruction, module, thread, or the like. A program or module may also include a commercial software application or product, which may itself include several programs. However, while the invention is being described in the context of software, it is not meant to be limiting as those of skill in the art will appreciate that various of the acts and operation described hereinafter may also be implemented in hardware.

Figure 2:
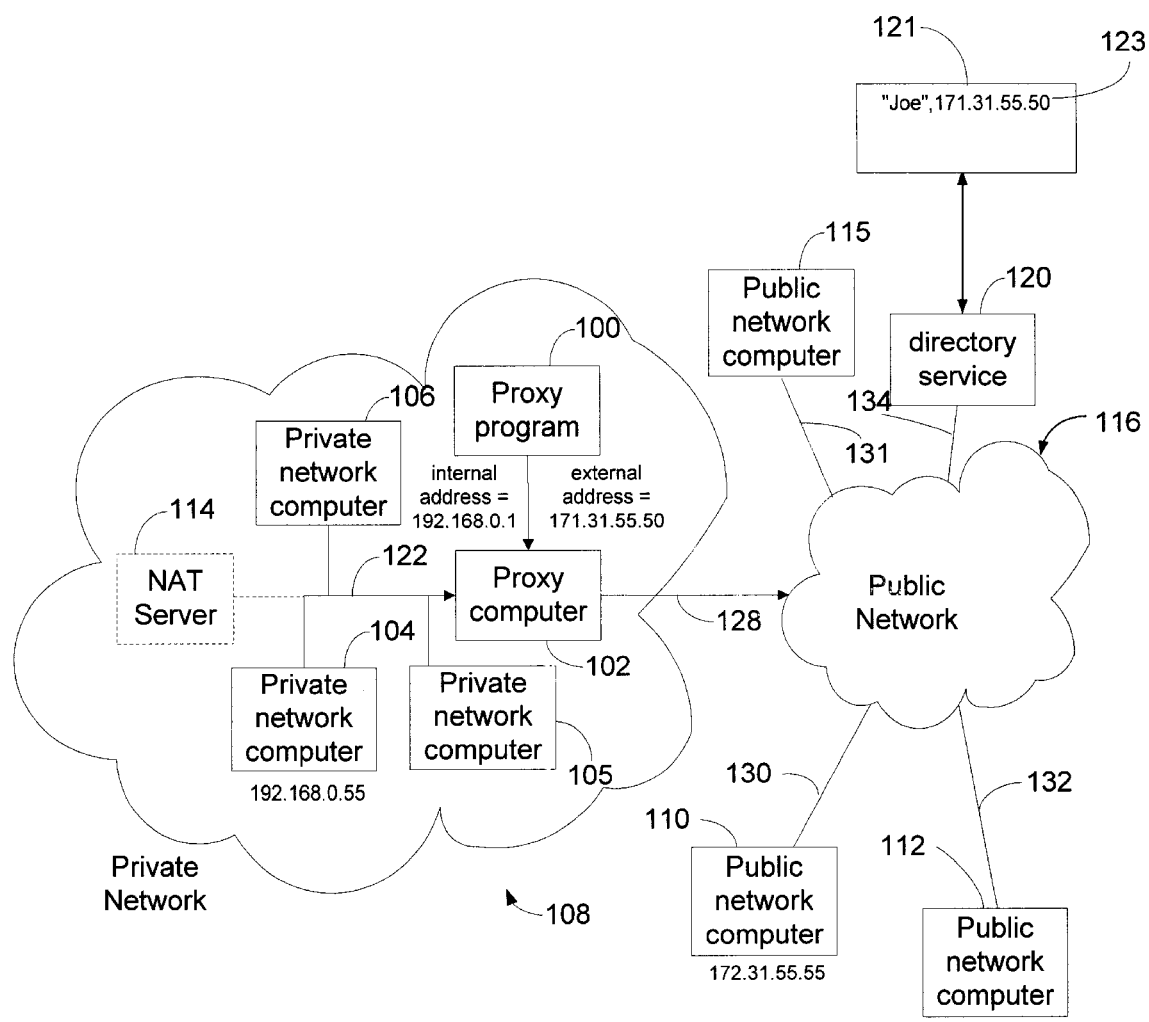
FIG. 2 is block diagram illustrating an example of a network environment in which invention can operate.

The invention is generally realized as a method of proxying a call originating from a public network to a computer on a private network using a publicly-known alias obtainable from a directory service. Turning now to FIG. 2 an example of a network environment in which invention can operate is shown. A proxy program, generally labeled 100, executes on a proxy computer 102 of a private network 108. The proxy computer 102 acts as a conduit through which data may be transmitted from the private network 108 to a public network 116 and vice versa over a network link 128. The proxy computer 102 is linked to one or more network computers, such as network computers 104, 105 and 106 by a network link 122. The proxy computer 102 and the computers 104–106 may be implemented as any suitable computing devices, including workstations, personal computers, servers, handheld devices, or the like. The proxy computer may function as a peer of the network computers 104–106.

The public network 116 includes computers 110, 112 and 115, which are communicatively linked to the network 116 by network links 130, 132 and 131 respectively. To help illustrate the operation of the invention, it will be assumed that the public IP address of the proxy computer 102 is 171.31.55.50, and is recognizable by the public network 116, while the private IP address of the proxy computer 102 is 192.168.0.1. It is further assumed that the IP address of the computer 104 is 192.168.0.55, and the IP address of the computer 110 is 172.31.55.55. It is finally assumed that private IP addresses of the private network 108, such as that of the computer 104, are unroutable outside of the private network 108.

The private network 108 may be a home network, business enterprise network, institutional network, government agency network, or the like. The public network 116 may be one that is available to the general public, such as the Internet, or one that is available to a group of users. Access to the computers of the private network 108 may be gained through the proxy computer 102. The public network 116 may even be an internal network that is in the same organization as the private network 108. For example, the public network 116 may be accessible to all employees of a company, while the private network 108 is accessible only to a certain department. The private network 108 and the public network 116 may themselves be comprised of any number of sub-networks. Although the number of computers depicted in the private network 108 and the public network 116 is relatively small, it is understood that the number is meant only to be illustrative, and that these networks may, in fact, have any number of computers. It is also understood that there may be other computing devices between the proxy computer 102 and the public network 116, including gateways, routers, firewalls, and the like. The proxy computer 102 itself may also be implemented as a gateway, router, firewall, or the like.

To make audio or visual telephony calls to a computer of the private network 108 in accordance with a preferred embodiment of the invention, a computer of the public network 116 uses the alias of the private network computer to request an IP address. The alias may be comprised of plain text alphanumeric characters, such as an email alias. The calling computer submits the request to a directory service 120, which may be an Internet location server (ILS) communicatively linked to the public network 116 by a network link 134. The directory service 120 looks up the alias in a directory 121 and returns the IP address that is listed for that alias, which, in this example, is the public IP address of the proxy computer 102. The calling computer then sends a call setup message to the listed IP address—i.e. to the proxy computer 102—and includes the looked-up alias in the call setup message. The proxy program 100 uses the alias to determine which computer of the private network 108 is the callee, and creates a logical connection between the calling computer and the callee computer.

Figure 3:
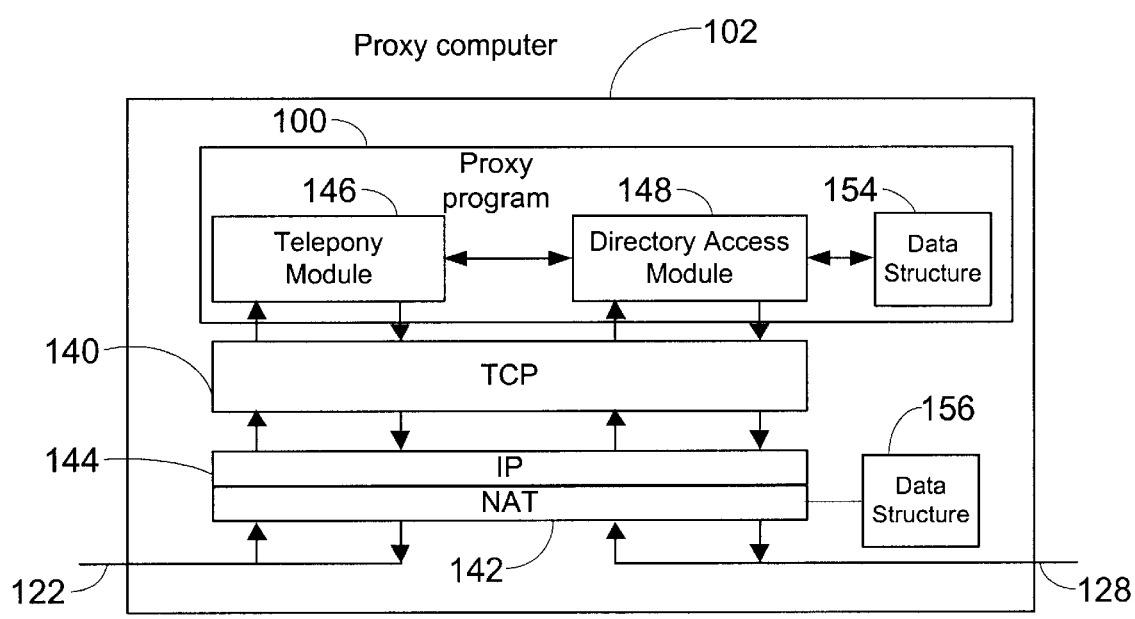
FIG. 3 is a block diagram illustrating an example of an architecture that may be used for a proxy program.

Referring to FIG. 3, an example of an architecture that may be used for a proxy program operating in accordance with a preferred embodiment of the invention is shown. Several functions of the proxy program 100 are performed by a telephony module 146 and a directory access module 148. The directory access module 148 processes requests from one or more of the computers of the private network 108 to register aliases with the directory service 120 (FIG. 2), and processes the corresponding responses received from the directory service 120. The directory access module 148 also maintains a data structure 154, which may be an address translation table, or the like, that associates the aliases being used by the computers of the private network 108 with their respective private network addresses. The telephony module 146 establishes logical connections between the public network computers and the private network computers.

To communicate, the telephony module 146 and directory access module 148 transmit and receive messages through a transport control protocol (TCP) module 140 and an internet protocol (IP) module 144. The TCP module 140 wraps messages received from the modules 146 and 148 into one or more TCP segments, which are then sent to the IP module 144. The IP module 144 further wraps the TCP segments received from the TCP module 140 into IP packets which may then be transmitted either to the private network 108 or to the public network 116 over the network links 122 and 128 respectively. The TCP module 140 and IP module 144 also unwrap TCP and IP messages respectively as they travel up to the telephony module 146 and directory access module 148.

In creating an IP packet, the IP module 144 generates an IP header having a source and a destination IP address. The telephony 146 may provide the source and destination IP address to the IP module 144 via the TCP module 140. A network address translation (NAT) module 142 redirects the IP packets generated by the IP module 144 to the proper IP address and port number according to a set of redirect instructions stored in a data structure 156, which may be a look-up table or the like. Network address translation is a well known networking procedure, and may be implemented as described in the Internet Engineering Task Force (IETF) request for comments (RFC) 1631, by K. Egevang and P. Francis, published May 1994.

Referring to FIGS. 2 and 3, an example of how computer 104 of the private network 108 registers an alias with the directory service 120 using the proxy program 100 in accordance with the present invention will be described. The computer 104 first generates a message containing a request to have the alias "Joe" registered with the IP address 192.168.0.55. The computer 104 sends the request with the intended destination being the directory service 120. The directory access module 148 of the proxy program 100 receives the message after it passes through the NAT module 142, the TCP module 140 and the IP module 144. The directory access module 148 then generates a second message containing a request to have the alias "Joe" registered with the IP address 171.31.55.50 (the public IP address of the proxy 102) on behalf of the computer 104. The directory access module 148 then sends the second message back down through the TCP module 140 and the IP module 144. The second message is then sent over the network link 128 and to the public network 116 for transmission to the directory service 120 over the network link 134.

If the directory service 120 grants the request, it creates an entry in the directory 121—the entry 123, for example—that associates the IP address 171.31.55.50 with the alias "Joe." The directory service 120 then transmits an response message back over the network link 134, the public network 116, the network link 128 and to the proxy computer 102. The response then travels up the NAT module 142, IP module 144, the TCP module 140 and to the directory access module 148. The response message confirms that the alias "Joe" has been registered with the IP address 171.31.55.50. The directory access module 148 then transmits the modified response message down through the TCP module 140, the IP module 144, the NAT module 142 and back to the private network computer 104. The directory access module 148 also creates an entry in the data structure 154 that associates the IP address 192.168.0.55 with the alias "Joe."

In a related aspect of the invention, the NAT module 142 (FIG. 3) may assist the directory access module 148 by intercepting requests and responses to and from the directory service 120 (FIG. 2). For example, one protocol that may be used to communicate with the directory service 120 is the well-known Lightweight Directory Access Protocol (LDAP), a version of which is described in IETF-RFC 2251, by M. Wahl, T. Howes and S. Kille, published in December 1997. LDAP messages are transmitted over ports 1002 and 389. Thus, to insure that all LDAP messages are routed to the proxy program 100 on the proxy computer 102, the proxy program 100 may, upon initialization for example, insert the NAT redirect instructions "1002, *" and "389, *" into the data structure 156. These instructions insure that the NAT module 142 redirects all messages received on these ports to the proxy computer 102 and up to the proxy program 100. Although the NAT module 148 is depicted as being located on the proxy computer 102, persons of ordinary skill in the art will recognize that the NAT module 148 and data structure 156 may instead be located on a separate computer of the private network 108, such as on a NAT server 114, which is depicted as a dashed block in FIG. 2. If employed, the NAT server 114 may intercept messages traveling through the private network 108 and redirect them to the port and IP address or addresses specified in the data structure 156.

Once the proxy computer 102 has registered the alias "Joe" with the directory service 120 on behalf of the computer 104, a computer on the public network 116 can initiate a call to the computer 104 using the registered alias. The computer 110 can, for example, send a request to obtain the IP address for "Joe" to the directory service 120. In response to the request, the public network computer 110 would receive the external IP address of the proxy computer 102, which is 171.31.55.50 in this example.

To make a call to the computer 104, the computer 110 transmits a setup message containing the alias "Joe" over the network link 130, through the public network 116, over the network link 128 and to the proxy computer 102. The proxy program 100 receives the setup message after it passes through the NAT module 142, the IP module 144 and the TCP module 140. The telephony module 146 extracts the alias "Joe" from the setup message and submits a request for the IP address of the of the computer currently using the alias "Joe" to the directory access module 148. The directory access module 148 then looks up the alias "Joe" in the data structure 154 and determines that the alias is associated with the IP address 192.168.0.55—that of the computer 104. The directory access module 148 returns the IP address to the telephony module 146.

The telephony module 146 generates a second setup message that has contains the the IP address 192.168.0.55. The telephony module 146 also provides the new destination IP address to the TCP module 140, which in turn provides the new IP address to the IP module 144. The telephony module 146 then sends the setup message down through the TCP module 140 and to the IP module 144. The IP module 144 creates an IP header having a destination address of 192.168.0.55 for the setup message. The IP module 144 then sends the setup message through the NAT module 142 and out over the network link 122 to the computer 104. The second setup messages performs the same function as the setup message received from the computer 110, except that the callee IP address is now that of the actual callee (computer 104) instead of the proxy. In effect, the proxy sends a call setup message to the computer 104 on behalf of the actual caller.

The telephony module 146 continues to receive signaling and control messages from the computer 110. Those inbound and outbound messages that do not contain callee information or port number assignments are simply forwarded by the telephony module to the computer 104 or the computer 110 respectively. This forwarding process occurs at the TCP and IP modules 140 and 142, and involves replacing instances of the proxy's IP address with the private network computers' IP address in the IP headers, and replacing the port numbers assigned by the public network computer 110 with port numbers chosen internally by the telephony module 146 in the TCP headers. The telephony module 146 may also negotiate with the computer 104 and the computer 110 to determine which ports are to be used for communication between the proxy computer 102 and the private network computer 104, as well as between the proxy computer 102 and the public network computer 110. As a result of the negotiation, the telephony module 146 may agree to communicate with the computer 104 on one set of ports and agree to communicate with the computer 110 on another different set of ports.

In another related aspect of the invention, the NAT module 142 may assist in setting up one or more calls by routing call signaling messages to the proxy program 100. For example, one method of call signaling that may be used by a computer of the public network 116 is the well-known International Telecommunications Union (ITU) recommendation Q.931, which is incorporated by reference herein in its entirety. Q.931 signaling messages are transmitted using port 1720. Thus, to insure that all Q.931 messages are routed to the proxy program 100 on the proxy computer 102, the proxy program 100 may, upon initialization for example, insert the NAT redirect instruction "1720, *" into the data structure 156. This instruction insures that the NAT module 142 redirects all messages received on these ports to the proxy program 100.

Once logical connections between the proxy computer 102 and the public network computer 110, and between the proxy computer 102 and the private network computer 104 have been negotiated, it is preferred that the media packets used to transmit audio and visual information are no longer routed through the proxy program 100 but instead are redirected onto the appropriate ports and IP addresses by the NAT module 142. The telephony module 146 may determine when the logical connections have been successfully negotiated and transmit all of the appropriate redirect instructions with their respective port assignments and IP addresses to the NAT module 142. The NAT module 142 can then store these redirect instructions in the data structure 156 and redirect the media packets based on the instructions with no involvement from the proxy program 100. As the telephony module 146 creates logical connections between multiple computers of the private network 108 and multiple computers of the public network 116, the telephony module may store redirect instructions in the data structure 156 that instruct the NAT 142 to redirect multiple calls simultaneously.

According to a preferred embodiment of the invention, the telephony module 146 creates a call bridge object (FIG. 5) for each call being proxied between a computer of the private network 108 (FIG. 2) and a computer of the public network 116. Each call bridge object 200 maintains information regarding the connection state of the call and contains the logic required to process incoming and outgoing call control information. Similarly when one or more of the computers of the private network 108 attempt to access the directory service 120, the directory access module 148 creates a connection object 202. Each connection object 202 contains the processing logic for handling requests from computers of the private network 108 for access to the directory service 120 as well as for handling the responses received from the directory service 120.

Figure 4:
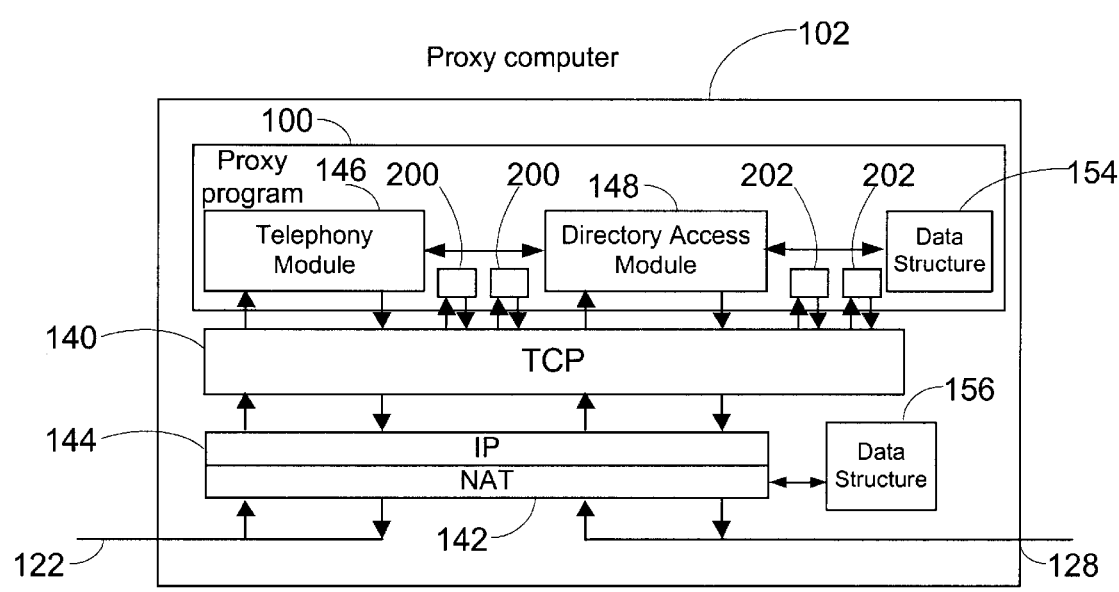
'FIG. 4 is a block diagram illustrating specific features that may be used in the example proxy program of FIG. 3.
Figure 5:
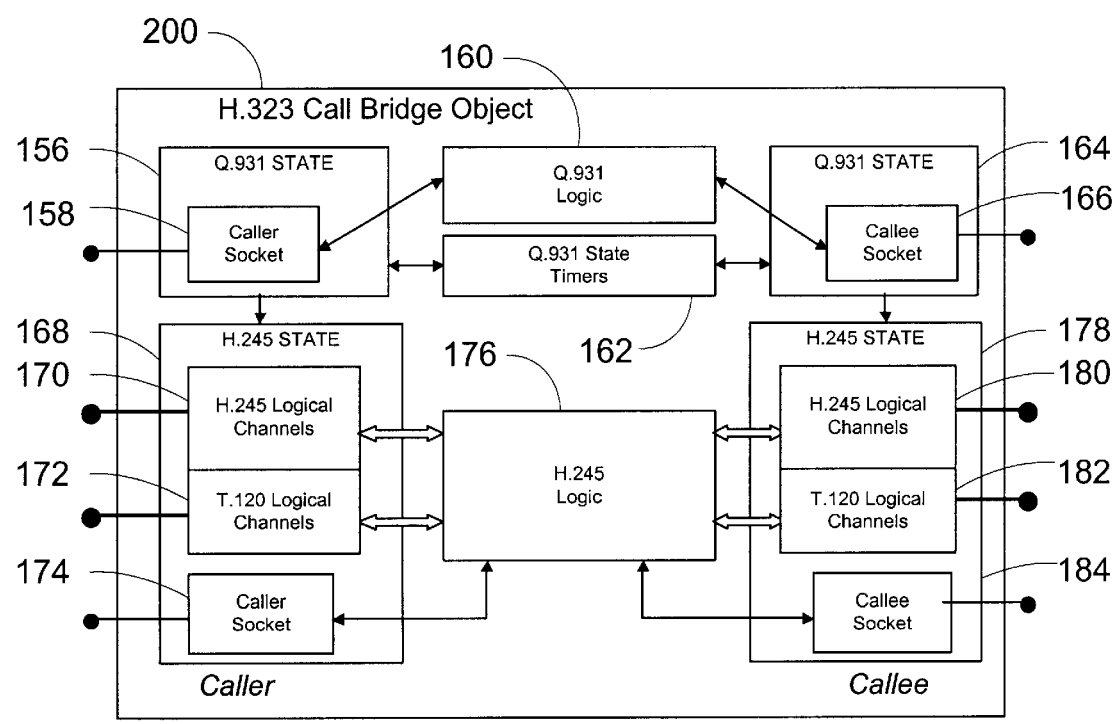
FIG. 5 is a block diagram illustrating an example of an architecture that may be used for an H.323 call bridge object.

To process a call made according to the well-known ITU recommendation H.323, a call bridge object (FIG. 4) may have the architecture shown in FIG. 5. The H.323 call bridge object 200 contains Q.931 state modules 156 and 164 for maintaining the signaling state of the caller and callee respectively. The call bridge object 200 also contains H.245 state modules 168 and 178 for maintaining the state of the H.245 call control for the caller and callee respectively, according to the well-known ITU recommendation H.245 (incorporated herein by reference in its entirety). The H.245 state modules 168 and 178 each contain H.245 logical channel modules 170 and 180 as well as T.120 logical channel modules 172 and 182 for maintaining the state of the H.245 and T.120 channels for the caller and callee 20 respectively, according to the well-known ITU recommendation T.120 (incorporated herein by reference in its entirety). The Q.931 state modules, 56 and 164 and the Q.245 state modules 168 and 178 further contain sockets 158, 166, 174 and 184 for communicating with the respective caller and callee. The sockets 158, 166, 174 and 184 may be implemented according to the well-known WINSOCK standard.

The logical processing of the Q.931 call signaling and H.245 call control messages is accomplished by the Q.931 and H.245 logic modules 160 and 176 respectively. A Q.931 state timer module 162 performs timing functions for the Q.931 state modules 156 and 164. The H.323 call bridge object sends and receives Q.931 messages to and from a caller or a callee at the caller socket 166 or the callee socket 158 respectively and processes the messages in the Q.931 logic module 160. Similarly, the H.323 call bridge object sends and receives H.245 messages to and from a caller or callee at the caller socket 174 or callee socket 184 respectively and processes the messages in the H.245 logic module 176.

Figure 6:
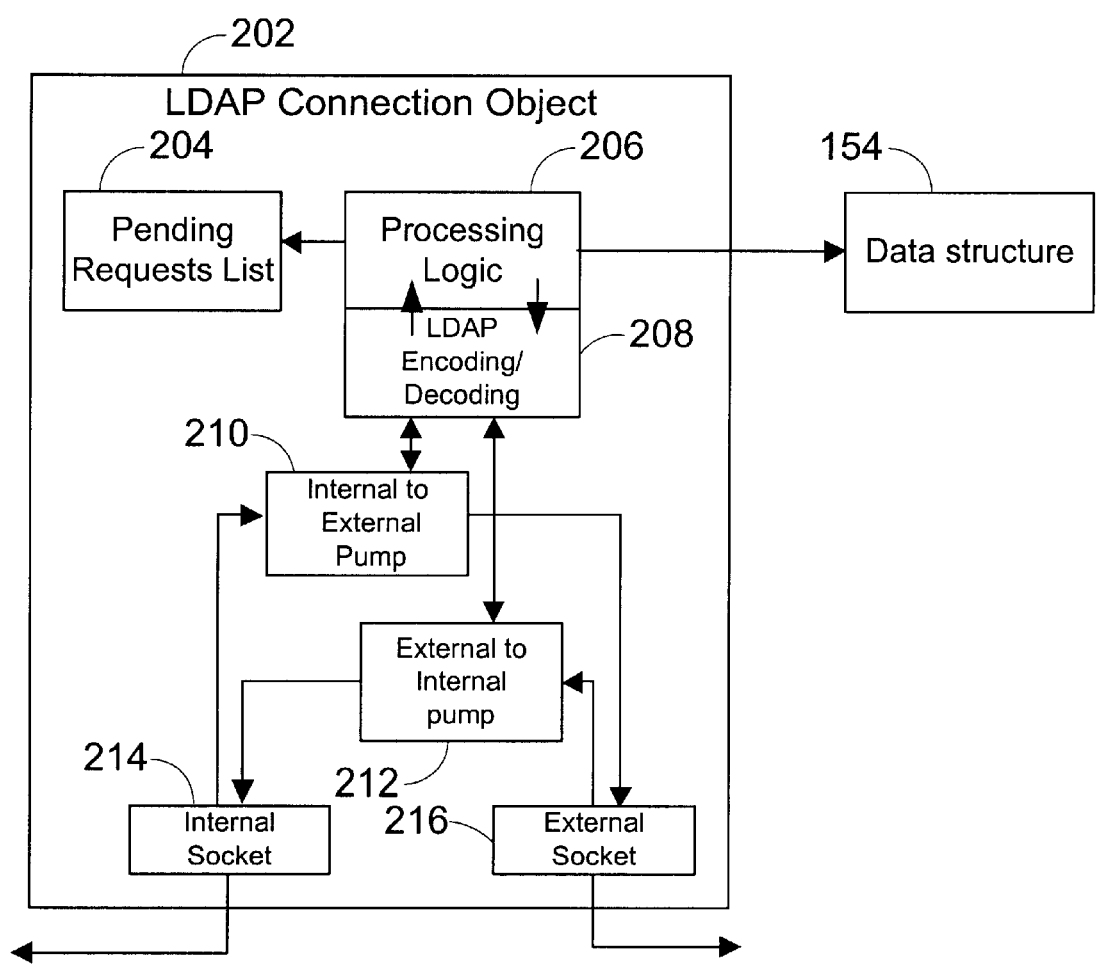
FIG. 6 is a block diagram illustrating an example of an architecture that may be used for an LDAP connection object.

To process an attempt by a computer of the public network 108 to access the directory service 120 using LDAP, a connection object (FIG. 4) may have the architecture shown in FIG. 6. The LDAP connection object 202 has a processing logic module 206 for processing LDAP messages received from a computer of the private network or from the directory service 120 (FIG. 2). LDAP messages are encoded and decoded in an encoding/decoding module 208. As requests arrive from one or more of the computers of the private network 108, they are stored in a pending requests list 204. An internal to external pump 210 and an external to internal pump 212 communicate with an internal network socket 214 and an external network socket 216 respectively to send LDAP messages to the private network 108 and to the public network 116. Once a request for an addition of an alias to the directory service 120 is approved by the directory service 120 and a successful response to the request is received by the proxy program 100, the processing logic module 206 creates an entry in the data structure 154 that associates the alias with the computer of the private network 108 that submitted the request.

Figure 7:
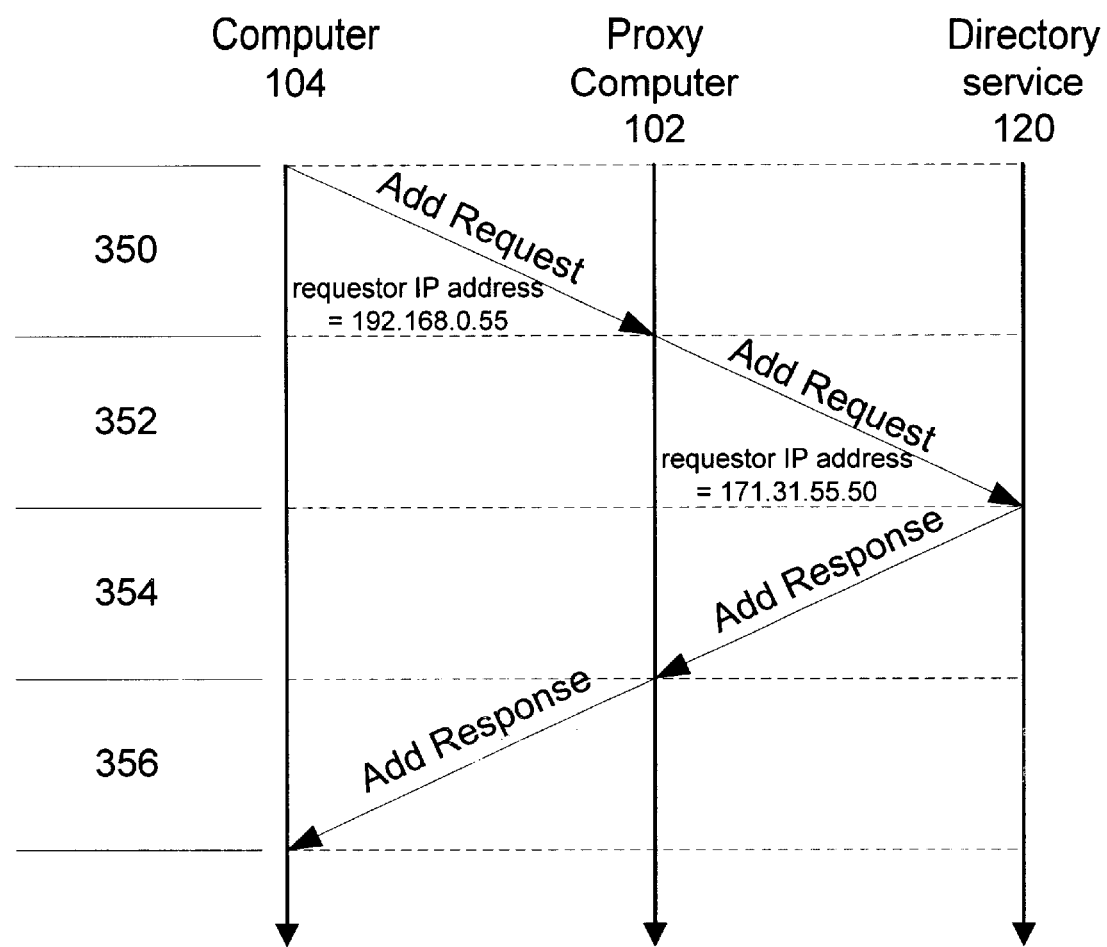
FIG. 7 is a call flow diagram illustrating an example message flow of AddRequest and AddResponse messages between a private network computer and a directory service.

An example of how a computer of the private network 108 (FIG. 2) may register an LDAP alias with the directory service 120 by communicating through the LDAP connection object (FIG. 6) will now be described. The call flow diagram of FIG. 7 shows the message flow that occurs between the computer 104 and the proxy computer 102, as well as between the proxy computer 102 and directory service 120 as the computer 104 attempts the registration process. At step 350 the computer 104 transmits an LDAP AddRequest message on port 1002 having the destination IP address (in the IP header) of the directory service 120. The body of the AddRequest message itself contains the IP address of the requestor—192.168.0.55—as well as the alias under which the requestor is to be registered—"Joe." As the AddRequest message reaches the proxy computer 102, the NAT module 142 (FIG. 4) detects that the message is being sent to port 1002 and redirects the message up through the IP module 144 and the TCP module 140 to the proxy program 100. The proxy program 100 creates a connection object 202 having the architecture shown in FIG. 6.

The LDAP connection object 202 receives the AddRequest message on the internal socket 214. The AddRequest message is then retrieved by the pump 210 and sent to the encoding/decoding module 208 to be decoded. The decoded message is then sent to the processing logic module 206. In this example it is assumed that the alias chosen by the computer 104 is the name "Joe." The processing logic module 206 generates a second AddRequest message that is similar to the one received from the computer 104, except that, instead of having a requester IP address of 192.168.0.55, the second AddRequest message has a requester IP address of 171.31.55.50, which is the public IP address of the proxy computer 102. The processing logic module 206 then stores state information about the request AddRequest message in the pending request list 204. The processing logic module then sends the message to the encoding/decoding module 208 to be encoded according the LDAP protocol. The encoding/decoding module 208 then sends the AddRequest message to the pump 210. The pump 210 then sends the message down through the TCP module 140 (FIG. 4), the IP module 144, the NAT module 142, out the network link 128, over the public network 116 (FIG. 2) and to the directory service 120. Step 352 of FIG. 7 shows the modified AddRequest being transmitted to the directory service.

The directory service 120 determines whether or not to grant the request according to its own internal logic. In this example it will be assumed that the directory service has granted the request. The directory service 120 transmits an AddResponse message back to the proxy computer 102 as shown in Step 354 of FIG. 7. The AddResponse message contains a success code to indicate the fact that the request has been granted. The AddResponse message then travels up through the NAT module 142 (FIG. 4), the IP module 144, the TCP module 140 and to the LDAP connection object (FIG. 6). The AddResponse message travels through the external socket 216, the external to internal pump 212, and to the encoding/decoding module 208. The AddResponse message is then decoded by the encoding/decoding module 208 and sent to the processing logic module 206. The processing logic module 206 then deletes the state information concerning the request from the pending request list 204.

If the AddResponse message indicates that the directory service 120 has accepted the request, the processing logic module 206 makes an entry in the data structure 154 associating the IP address of the private network computer 104 with the alias "Joe." Examples of data entries that may be created in the data structure 154 are shown in the following table:

| Address of private network computer | Alias of the computer | Address of the directory service | Directory or path on the directory service |
|---|---|---|---|
| 192.168.0.55 | Joe | 157.54.6.150:389 | cn=joe,ou=Dynamic,o=Intranet |
| 192.168.0.2 | art@bar.com | 157.54.6.150:389 | cn=art,ou=Dynamic,o=Intranet |
| 192.168.0.133 | john_d | 172.31.89.77:1002 | cn=john_d,ou=dynamic,o=Intranet |

The processing logic module 206 provides the correct destination IP address—196.168.0.55—to the IP module 144 via the TCP module 140 (FIG. 4). The AddResponse message is then sent back down to the pump 212 then to the socket 214 for transmission to the TCP module 140 and the IP module 144. The IP module 144 wraps the message into an IP packet and inserts the destination IP address into the IP header. The message is then sent to the computer 104, thereby completing the process.

Figure 8:
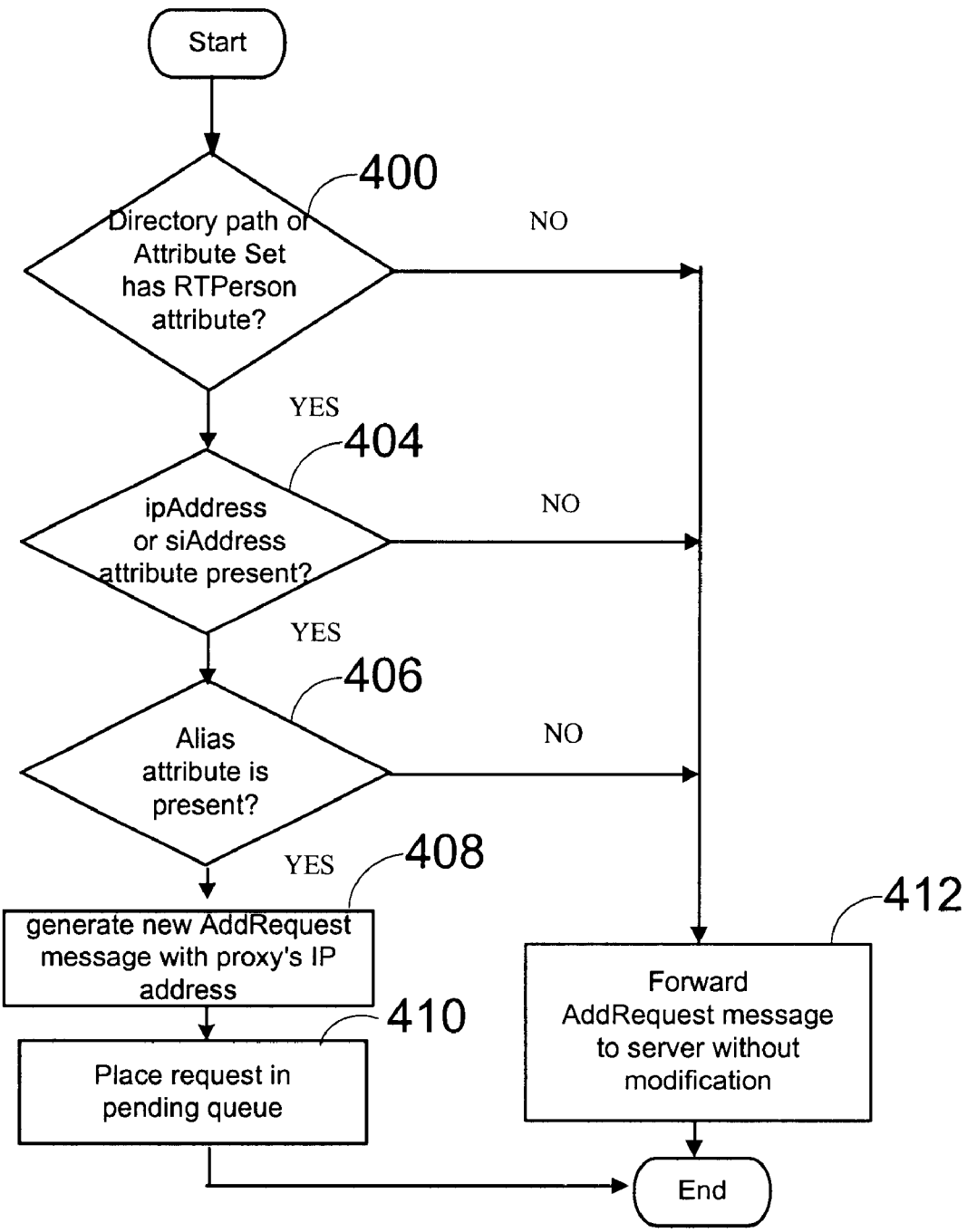
FIG. 8 is a flow chart illustrating an example of steps that may be performed when processing an AddRequest message.

To ensure that only authorized computers on the private network 108 register with the directory service 120 (FIG. 2), the processing logic module 206 (FIG. 6) preferably verifies the authenticity of each AddRequest message by executing the procedure of the flow chart FIG. 8. At steps 400–406 the processing logic module 206 determines whether the RT person, IP address, and alias attributes are present in the AddRequest message. If any of those attributes are not present the processing logic module 206 does not modify the AddRequest message, but simply passes it to the directory service 120.

Figure 9:
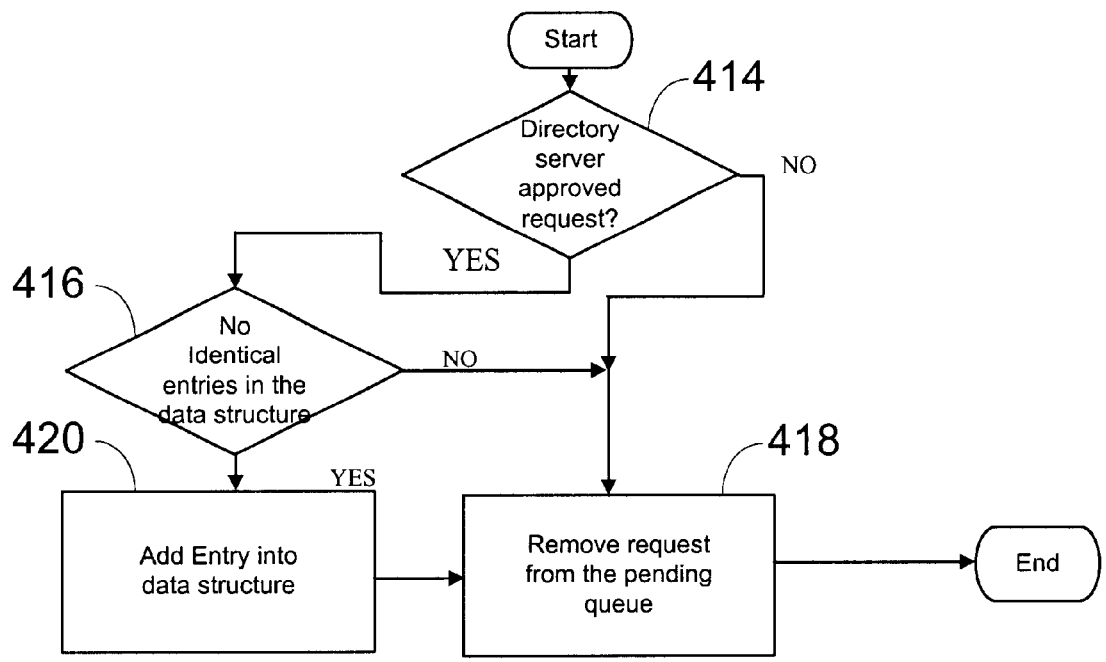
FIG. 9 is a flowchart illustrating an example of steps that may be performed when processing an AddResponse message.

Referring to FIG. 9, an example of how the processing logic module 206 (FIG. 6) may process an AddResponse message received from the directory service 120 (FIG. 2) is shown. At step 414 the processing logic module determines whether the directory service approved the request. If the directory service approved the request then the flow proceeds to 416 at which the processing logic module determines whether the data structure 154 contains an identical entry. If no identical entries are contained in the data structure then the processing logic module adds an entry associating the alias with the IP address of the private network computer to the data structure at step 420. If the directory service did not approve the request or there is already an identical entry in the data structure then the processing logic module skips step 420.

The proxy program 100 (FIG. 2) may also send LDAP SearchRequest messages to the directory service 120 on behalf of one or more computers of the private network 108. An LDAP SearchRequest message is a request to a directory service to obtain the IP address corresponding a submitted alias. State information for the SearchRequest is maintained in the pending requests list 204 of the LDAP connection object 202 (FIG. 6) until a response is received. A directory service receiving the message typically responds with a SearchResponse message.

Figure 10:
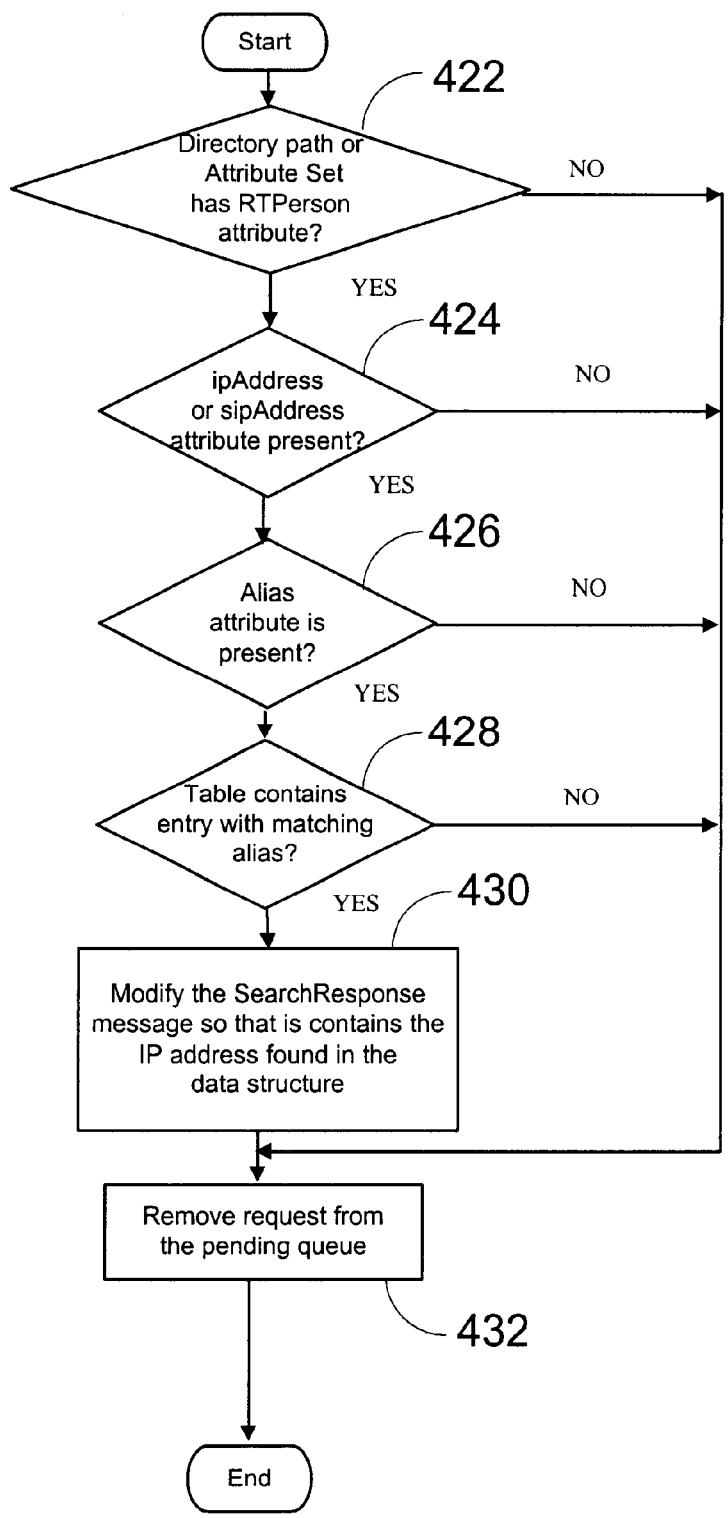
FIG. 10 is a flowchart illustrating an example of steps that may be performed when processing a SearchResponse message.

Referring to FIG. 10, an example of how the processing logic module 206 of the LDAP connection object 202 may handle a SearchResponse message received from the directory service 120 is shown. At steps 422–426 the logic processing module 206 verifies that the search response message contains an RT person, an IP address and an alias attribute. If any of these attributes is not present then the processing logic module 206 simply relays the search response message to the private network computer at step 432.

At step 428 the processing logic module 206 determines whether there is an entry in the data structure 154 that corresponds to the alias and IP address contained in the search response message. This is to account for the possibility that client program running on the proxy computer 102 itself and acting as a client of the proxy program 100 is searching for a computer on the private network 108. For example, if a client program running on the proxy computer 102 sends a Search message for the alias "Joe," then the IP address returned by the directory service 120 will be 171.31.55.50, since that is how "Joe" is listed in the directory 121. This IP address will, of course, be of little help to the client program.

If the processing logic module 206 finds the sought-after alias in the data structure 154, then it will generate a second SearchResponse message that contains the IP address of the computer associated with the alias. Thus, instead of receiving the IP address of 171.31.55.50 in response to a SearchRequest for "Joe," a client program running on the proxy computer 102 receives the IP address 192.168.0.55.

The proxy program 100 (FIG. 2) may also forward LDAP Delete messages received from computers of the private network 108 to the directory service 120. An LDAP Delete message is a request to a directory service to delete an entry. The body of a Delete message contains the alias of the entry to be deleted. When it receives an LDAP delete message from within the private network 108, the logic processing module 206 determines whether the entry that the private network computer has requested to be deleted is located in the data structure 154. If there is an entry in the data structure 154 corresponding to the IP address and the alias contained in the delete request then the logic processing unit 206 deletes the entry from the data structure 154.

An example of how a computer of the public network 116 (FIG. 2) may make an H.323 call to a computer of the private network 108 through the proxy computer 102 using an H.323 all bridge object (FIG. 5) will now be described. In this example, the computer 110 will call the computer 104. It will, however, be understood by persons of ordinary skill in the art that the computer 110 may actually be relaying or proxying a call from one or more other computers, and may even be acting as a public proxy for a second private network. It is assumed that the private network computer is already registered with the directory service 120 and is represented by the entry 123. It is also assumed that this registration was performed using the procedure described in steps 350–356 of FIG. 9 or a similar procedure, and, therefore, that the data structure 154 (FIG. 4) associates "Joe" with the IP address of the computer 104. It is also be assumed that the computer 110 has already performed an LDAP search for the alias "Joe" and has obtained the IP address 171.31.55.50.

Figure 11:
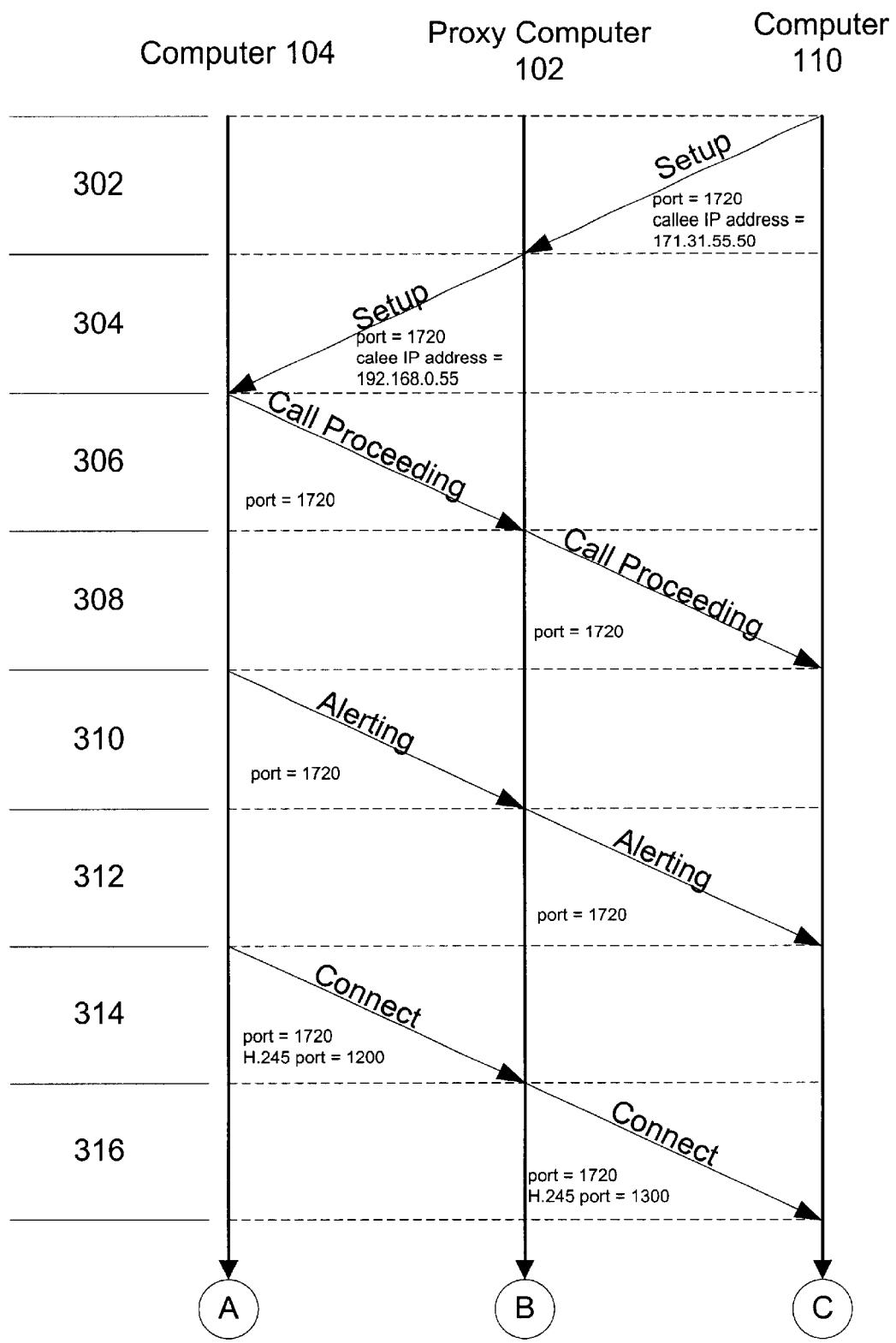
FIGS. 11 and 12 are call flow diagrams illustrating an example of the message flow between a private network computer and a public network computer in creating a logical connection between the computers.
Figure 12:
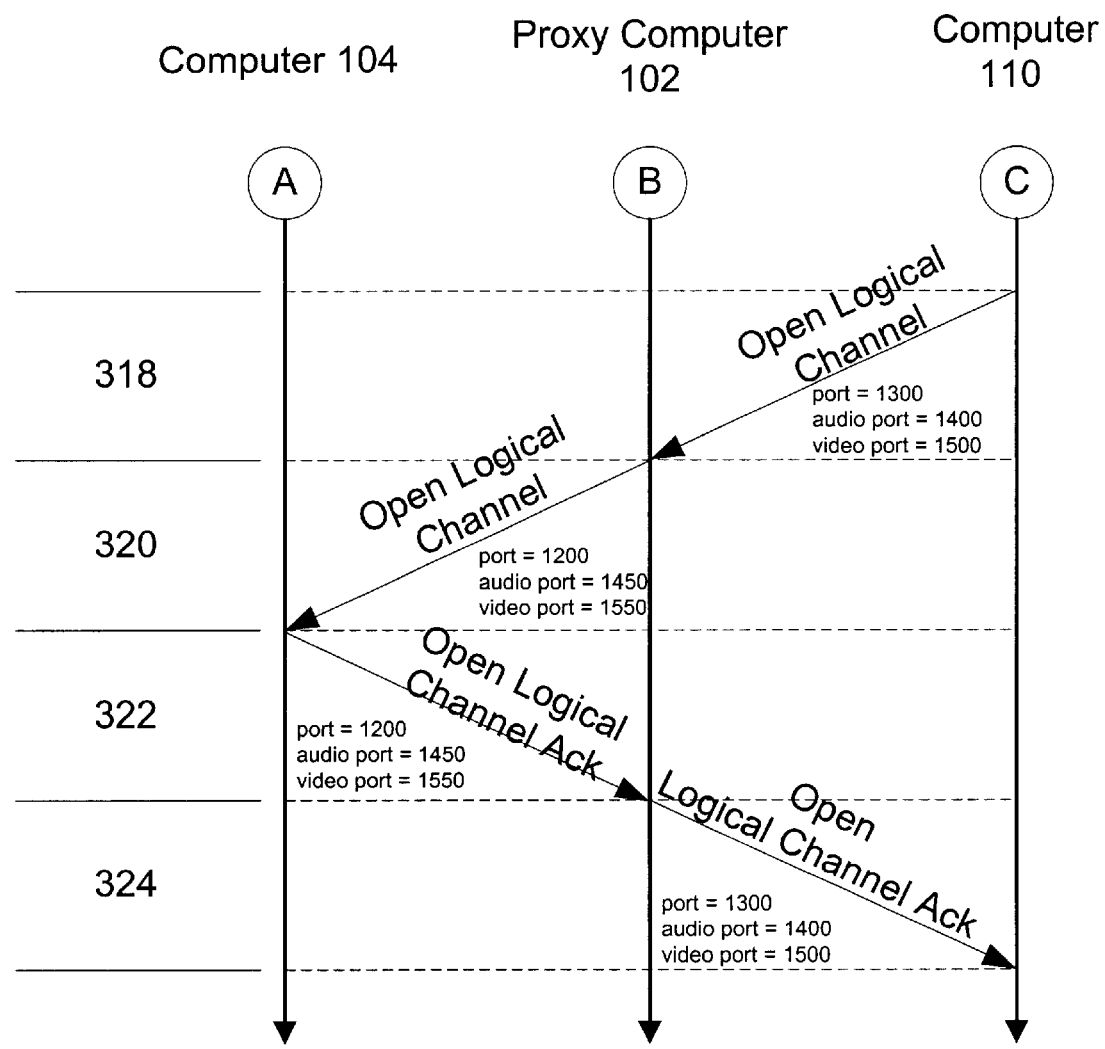

Referring to the call flow diagram of FIGS. 11 and 12, the public network computer 110 sends a Q.931 SETUP message to port 1720 of the proxy computer at step 302. The SETUP message reaches the proxy computer 102 over the network link 128 (FIG. 4) and is intercepted by the NAT module 142, which is monitoring port 1720. The NAT module 142 sends the SETUP message up through the IP module 144, the TCP module 140 and into a call bridge object 200 which in this example, is an H.323 call bridge object (FIG. 5). The H.323 call bridge object receives the SETUP message on the caller socket 158 of the Q.931 state module 156. The SETUP message is then sent to the Q.931 logic module 160. The Q.931 logic module 160 recognizes that the SETUP message originated from outside of the private network and reads the alias "Joe" from the body of the SETUP message. The Q.931 logic module 160 then makes a function call to the directory access module 148 (FIG. 4) to request the IP address corresponding to the alias "Joe." The directory access module 148 searches the data structure 154 to determine which of the computers of the network 108 is using the alias "Joe." If the alias were not located then the directory access module 148 would signal this fact to the H.323 call bridge object 200. The H.323 call bridge object 200 would may then generate the appropriate error message to be transmitted back to the public network computer I 10, or forward the call to the proxy computer 102 itself In this example, however, the data structure 154 does have an entry for "Joe." The directory access module determines the IP address associated with the alias "Joe" to be 192.168.0.55 and provides this IP address to the Q.931 logic module of the H.323 call bridge object 200. The Q.931 logic module 160 then generates a second SETUP message on behalf of the computer 110. The second SETUP message has the same alias as the SETUP message sent by the computer 110, but has a callee IP address of 192.168.0.55. The Q.931 logic module 160 also provides the replacement IP address to the IP module 144 and stores the replacement IP address in the Q.931 state module 164 so that it need not make further calls to the directory access module 148. The Q.931 logic module 160 then transmits the modified SETUP message through the callee socket 166 (FIG. 5) through the TCP module 140 and the IP module 144. The IP module 144 creates an IP packet containing the message, and inserts the destination address of 192.168.0.55 into the IP header. The message passes through the NAT module 142 and out to the private network computer 104 at step 304. The private network computer 104 responds to the SETUP message with a CALL PROCEEDING message and an ALERTING message at steps 306 and 310. These messages are relayed by the H.323 call bridge 200 to the computer 110 at steps 306–312.

At step 314, the computer 104 transmits a Q.931 CONNECT message to the proxy computer 102. The body of the CONNECT message contains the number of the port to be used by the computer 104 for H.245 control data. The H.245 port number is dynamically chosen by the computer 104, and for this example is assumed to be port 1200. The Q.931 logic module 206 then generates a second CONNECT message on behalf of the computer 104. The second CONNECT message has the same format and function as the one received from the computer 104, except that the body of the second messages contains the H.245 port number chosen by the Q.931 logic module 160 communication with the computer 110. For the purpose of this example, it is assumed that the Q.931 logic module 160 chooses port number 1300 for sending and receiving H.245 control data to and from the public network computer 110. The Q.931 logic module 160 provides the destination IP address to the IP module 144.

At step 316, the Q.931 logic module 160 transmits the second CONNECT message out to the computer 110. As the second CONNECT message passes through the IP module 144, the IP module 144 wraps it into an IP packet, and inserts the destination IP address into the IP header.

At step 318 (FIG. 13), the public network computer 110 transmits an H.245 OpenLogicalChannel message to the proxy computer 102. The body of the OpenLogicalChannel message contains port numbers that are to be used for sending and receiving video and audio signals during the call. In this example, it is assumed that the computer 110 has chosen to use port 1400 for audio data and port 1500 for video data, and has indicated so in the body of the OpenLogicalChannel message. The OpenLogicalChannel message is received by the proxy computer 102 on the caller socket 174 of the H.245 state module 168 (FIG. 5). The message then travels to the H.245 logic module 176. The H.245 logic module 176 generates a second OpenLogicalChannel message on behalf of the computer 110. In this example, it will be assumed that the H.245 logic module has chosen port 1450 for audio communication and port 1550 for video communication with the private network computer 104. Thus, the H.245 logic module 176 inserts the port numbers 1400 and 1500 in the body of the second OpenLogicalChannel message.

At step 320 (FIG. 12), the H.245 logic module 176 transmits the second OpenLogicalChannel message to the private network computer 104. As the message passes through the IP module 144 (FIG. 4) it gets wrapped into an IP packet. The IP module 144 inserts the destination IP address into the packet header. At step 322, the computer 104 responds by transmitting an OpenLogicalChannelAck message to the proxy computer 102 over port 1200. At step 324 the proxy computer sends the OpenLogicalChannelAck message to the public network computer 110 on port 1300. On its way through the IP module 144, the modified message is wrapped into an IP packet with the destination IP address in the IP header. At this point, a logical connection has been established between the computer 104 and the public computer 110.

After having established the logical connection between the caller and callee computers, the proxy program 100 may instruct the NAT module 142 (FIG. 4) to redirect TCP/IP packets sent from the private network computer 104 on ports 1450 and 1550 to the to the public network computer 100 on ports 1400 and 1500. If instructed to do so, the NAT module 142 will also make the appropriate replacements in the IP header source and destination fields. For example, the proxy program 100 may enter the instructions (1450, 192.168.0.55→192.168.0.1)→(171.31.55.50→1400, 172.31.55.55) into the data structure 156. This prevents the proxy program 100 from having to interfere in the transmission of media packets between the private network computer 104 and the public network computer 110.

The above described procedure may also be used to allow one or more computers of the private network 108 to place outgoing calls to computers of the public network 116. By making the calls via the proxy computer 102, computers on the private network 108 may avoid having to disclose their internal IP addresses.

In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof

We claim:

1. A method of proxying telephony messages, the method comprising:

receiving a first call signaling message from a calling computer of a public network, the first call signaling message comprising an alias of a callee computer of a private network and a public network address of a proxy computer;

determining from the alias which computer of the private network is the callee computer;

generating a second call signaling message for performing the function of the first call signaling message on behalf of the calling computer, the second call signaling message comprising the alias and a private network address of the callee computer;

sending the second call signaling message to the callee computer;

receiving a first outbound call signaling message from the callee computer, the first outbound call signaling message comprising a first port assignment for the transmission of call control messages between the callee computer and the proxy computer;

generating a second outbound call signaling message for performing the function of the first outbound call signaling message, the second outbound call signaling message comprising a port assignment for the transmission of call control messages between the proxy computer and the calling computer; and sending the second outbound call signaling message to the calling computer.

2. The method of claim 1, wherein the first and second call signaling messages are setup messages for making a call from the calling computer of the public network to the callee computer of the private network.

3. The method of claim 2, wherein the setup messages are structured in accordance with the Q.931 protocol.

4. The method of claim 1, further comprising:

monitoring a port for the presence of call signaling messages; and if a call signaling message is determined to be present, forwarding the message to the proxy computer.

5. The method of claim 1, wherein the determining step further comprises:

making a function call to a directory access module that maintains a table of associations between aliases and network addresses of computers on the private network; and receiving the network address of the callee computer from the directory access module.

6. The method of claim 1, further comprising:

creating an H.323 call bridge object in response to the receipt of the first call signaling message, wherein the call bridge object maintains Q.931 state information and H.245 state information for the caller and callee.

7. The method of claim 1, wherein the outbound call signaling message is a connect message.

8. The method of claim 7, wherein the connect message is structured according to the Q.931 protocol.

9. A computer-readable medium having stored thereon computer executable instructions for performing the steps of claim 1.

10. A method of registering with a directory service on a proxy computer, the method comprising:

receiving a message comprising an alias for identifying a computer of the private network and a network address of the private network computer;

extracting from the message the network address of the private network computer;

replacing the network address of the private network computer with a public network address of the proxy computer in the message, wherein the alias is associated with the public network address of the proxy computer;

submitting the modified message to the directory service as a request to register the private network computer with the directory service; and creating an entry to associate the alias with the private network address of the private network computer.

11. The method of claim 10, wherein the request is structured according to LDAP.

12. The method of claim 10, wherein the directory service is an internet location server.

13. The method of claim 10, wherein the alias is an email alias.

14. A computer-readable medium having stored thereon computer-executable instructions for performing the steps of claim 10.

15. The method of claim 10, wherein a calling computer of a public network exchanges data with the private network computer via the proxy computer using the public network address of the proxy computer associated with the alias, and the proxy computer forwards data from the calling computer to the private network computer using the network address of the private network computer associated with the alias.

16. The method of claim 10 further comprising:

receiving a setup message with the alias of the private network computer from a calling computer of a public network;

determining the network address of the private network computer using the alias from the setup message;

generating a second setup message with the determined network address of the private network computer;

sending the second setup message to the private network computer; and assigning a first port assignment for communication between the private network computer and the proxy computer and a second port assignment for communication between the calling computer and the proxy computer.

17. A method of proxying telephony messages between a computer of a private network and a computer of a public network via a proxy computer connected to both the private network and the public network, the method comprising:

monitoring a port assigned to a directory service of the public network for a message from a private network computer as a request to register with the directory service, wherein the message includes an alias to associate the private network computer with a network address of the private network computer;

intercepting the message determined from the monitoring step;

extracting the network address of the private network computer from the message;

replacing the network address of the private network computer with a public network of the proxy computer in the message;

sending the modified message to the directory service;

determining whether the directory service registered the private network computer with the modified message; and creating an entry to associate the alias with the network address of the private network computer responsive to the private network computer being registered with the directory service.

18. The method of claim 17 further comprising:

receiving a message from a calling computer of the public network to connect with the private network computer, wherein the message is sent using the public network address of the proxy computer;

determining the network address of the private network computer from the created entry; and sending the message to the private network computer using the network address of the private network computer.

* * * * *